United States Patent
Ruesse (12)

(10) Patent No.: US 6,384,184 B1
(45) Date of Patent: May 7, 2002

(54) METHOD FOR DECREASING THE FORMALDEHYDE CONTENT IN ACIDIC SOLUTIONS OF MELAMINE FORMALDEHYDE RESINS

(75) Inventor: Steffen Ruesse, Monheim (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/701,105

(22) PCT Filed: May 14, 1999

(86) PCT No.: PCT/EP99/03334

§ 371 Date: Feb. 20, 2001

§ 102(e) Date: Feb. 20, 2001

(87) PCT Pub. No.: WO99/61499

PCT Pub. Date: Dec. 2, 1999

(30) Foreign Application Priority Data

May 23, 1998 (DE) .......................................... 198 23 155

(51) Int. Cl.⁷ .................................................. C08F 6/00
(52) U.S. Cl. ...................................................... 528/480
(58) Field of Search .......................................... 528/480

(56) References Cited

U.S. PATENT DOCUMENTS 4,656,059 A   4/1987   Mizuno et al. ............. 427/345

FOREIGN PATENT DOCUMENTS

| BE | 699 735 | 11/1967 |
| CZ | 192 269 | 8/1979 |
| GB | 1 121 649 | 7/1968 |
| JP | 52/015595 | 2/1977 |
| WO | WO94/10231 | 5/1994 |

OTHER PUBLICATIONS

Patent Abstracts of Japan, vol. 001, No. 054 (1997).
Chemical Abstracts vol. 96, No. 22 (1982).

*Primary Examiner*—Terressa M. Boykin
(74) *Attorney, Agent, or Firm*—Stephen D. Harper

(57) ABSTRACT

The content of free formaldehyde in an acidic solution of melamine-formaldehyde resin having a pH value ranging from 0.5 to 4 is reduced by reacting the formaldehyde with from 0.1 to 6 wt. %, based on the weight of be acidic solution, of an oxidizing agent such as hydrogen peroxide, performic acid or peracetic acid.

14 Claims, No Drawings

METHOD FOR DECREASING THE FORMALDEHYDE CONTENT IN ACIDIC SOLUTIONS OF MELAMINE FORMALDEHYDE RESINS

Acidic aqueous solutions of melamine-formaldehyde resins are used in the following technical fields: in the paper industry, as binders of water-based and solvent-based coatings, and as adsorbents or flocculating agents in wastewater treatment, as well as for coagulating solvent-based or water-based paints, for example, for the coating of automobiles.

For the purposes of the present invention, the term "aqueous solution" includes not only low-molecular solutions, but also colloidal solutions. For the above-mentioned fields of application, the melamine-formaldehyde polymers are, as a rule, cross-linked to the extent that they are in the colloidal size range. Owing to the method of preparation, at a content of from about 5 to about 30 wt. % melamine-formaldehyde resin, these solutions contain free formaldehyde in a concentration of between about 0.2 and about 4 wt. %. As formaldehyde may cause damage to health and is, moreover, regarded as being carcinogenic, it is desirable to lower the content of free formaldehyde.

The preparation of melamine-formaldehyde resins and the use thereof as an acidic colloidal solution for coagulating paint is described in U.S. Pat. No. 4,656,059. This reference contains detailed information regarding the preparation and the use of such resins and is hereby expressly incorporated in the present disclosure. In the; said document, the following information is given regarding the preparation of the melamine-formaldehyde resins and of an acidic colloidal solution therefrom:-

63 g melamine and 30 g formaldehyde or paraformaldehyde are mixed together in 93 ml distilled water. The mixture is adjusted to pH 10 by addition of sodium hydroxide solution and heated to 70° C. It is maintained at this temperature for 5 minutes and then cooled to room temperature. In the course of this, methylol melamine is precipitated. The precipitate is filtered, washed with methanol and dried under vacuum. The resins are partially cross-linked by acid in order that they may be used in the above-mentioned fields. To this end, the starting materials (melamine-formaldehyde, partially etherified), in the form of powder or dissolved, for example, in water or in alcohols, are reacted with acid. To prepare an acidic aqueous solution, 10 g of the methylol melamine is stirred into 100 ml of an 1.35% aqueous solution of hydrochloric acid. Prior to use, this solution is aged by being allowed to stand for 12 days at room temperature.

The melamine-formaldehyde resins may be in at least partially etherified form. To this end, the unetherified resins are etherified using alcohols preferably having 1 to 5 carbon atoms. Examples of such alcohols are methanol, ethanol, as well as propanol, butanol, pentanol and isomers thereof. Etherification is preferably carried out using methanol and/or n-butanol.

Besides hydrochloric acid, other strong monobasic acids, such as nitric acid and formic acid, are suitable for preparing the acidic aqueous solution. Which acid is preferred depends on the intended field of use. The economically priced hydrochloric acid is preferred for use in the paper industry and for the treatment of waste water. For use as a coagulant for paint, formic acid is preferably employed, as this is less corrosive than hydrochloric acid. Polybasic acids are unsuitable as a rule, because they lead to the formation of a deposit. Nitric acid gradually causes damage to the resins by oxidation; more strongly oxidizing acids, such as perchloric acid, cause such damage after a short time.

The object of lowering the content of free formaldehyde in acidic aqueous solutions of this type may be achieved according to WO 94/10231 by the addition to the solution of a β-Miketo compound. This is able to react with the free formaldehyde. This method has the disadvantage that 2 mol of a reagent having a high molecular weight compared with that of formaldehyde has to be added in order to bind 1 mol of formaldehyde. This weight relation of removed formaldehyde to added reagent is therefore very unfavorable and this entails economic disadvantages, as well as environmental disadvantages during disposal.

In contrast, an object of the present invention is to lower the free formaldehyde content of acidic aqueous solutions of melamine-formaldehyde resins simply and economically, without thereby damaging the melamine-formaldehyde resin.

This object is achieved by a process for decreasing the content of free formaldehyde in acidic solutions of melamine-formaldehyde resins, characterized in that an acidic aqueous solution having a pH of from 0.5 to 4 and containing between 5 and 30 wt. % melamine-formaldehyde resin is brought into contact with from 0.1 to 6 wt. %, based on the acidic aqueous solution of the melamine-formaldehyde resin, of an oxidising agent selected from hydrogen peroxide, performic acid and/or peracetic acid.

The formaldehyde is accordingly oxidised by a suitable oxidising agent (hydrogen peroxide, performic acid, peracetic acid or a mixture of these) to formic acid and/or to $CO_2$ and $H_2O$. The oxidising agents have a molar mass corresponding approximately to that of the formaldehyde. Within the above-mentioned concentration range they do not cause damage to the resin but they do bring about a definite lowering of the formaldehyde content. Depending on the procedure, the latter is lowered from starting values in the range of between 0.2 and 4 wt. % to values in the range of from 10 ppm to 1 wt. %.

The selected oxidising agents, hydrogen peroxide, performic acid and/or peracetic acid, have a redox potential at which formaldehyde may be readily oxidised, but the melamine-formaldehyde resin is not appreciably damaged by oxidation. Other oxidising agents, such as sodium perborate, prove to be insufficiently efficient or, for example in the case of potassium permanganate, potassium peroxydisulfate or sodium sulfite, they lead to decomposition of the melamine-formaldehyde resin or to the precipitation of a white paste from the acidic aqueous solution.

The decomposition of the formaldehyde may be effected by several procedural variants.

In variant A, 5 to 30 wt. % melamine-formaldehyde resin is dissolved in an acidic aqueous solution which contains from 0.1 to 5 wt. % hydrogen chloride and/or from 0.3 to 20 wt. % formic acid. Here, the solution in formic acid is preferred if the products are to be used for coagulating paint. This solution is maintained within a temperature range of about 5 to about 30° C. and, within 3 hours of its preparation, from 0.1 to 5 wt. %, based on the acid aqueous solution of the melamine-formaldehyde resin, of hydrogen peroxide, performic acid and/or peracetic acid is added thereto. Here, the content of free formaldehyde, which initially is in the range of 0.2 to 4 wt. %, falls to values in the range of about 0.01 to about 1 wt. %.

In variant B, an acidic aqueous solution of melamine-formaldehyde resin is first of all prepared as in variant A. This is allowed to stand at a temperature in the range of about 5 to about 30° C. for a period in the range of 3 to 48 hours, preferably in the range of 3 to 24 hours. This leads to a partial cross-linking of the melamine-formaldehyde polymer and renders this less sensitive to attack by the oxidising agent. After the above-mentioned waiting period, between 0.1 and 6 wt. %, based on the acidic aqueous solution of the melamine-formaldehyde resin, of hydrogen peroxide, performic acid and/or peracetic acid is added to this solution. Here again, the content of free formaldehyde falls to values of between 0.01 and 1 wt. %. Damage to the resin by oxidation is avoided more reliably than in variant A.

In variant C, an acidic aqueous solution of the melamine-formaldehyde resin is also first of all prepared as in variant A. This is heated to a temperature in the range of 30 to 100° C., preferably in the range of 50 to 70° C. and in particular to about 60° C. Under these temperature conditions, the partial cross-linking of the melamine-formaldehyde resin is terminated after about 30 minutes. From about 30 minutes to about 5 hours after the heating, 0.1 and 6 wt. %, based on the acidic aqueous solution of the melamine-formaldehyde resin, of hydrogen peroxide, performic acid and/or peracetic acid is added to the acid aqueous solution at the reaction temperature. By this means, the content of free formaldehyde is lowered to values of between about 10 ppm and about 0.5 wt. %.

The quantity of oxidising agent (hydrogen peroxide, performic acid and/or peracetic acid) preferably to be added depends on the melamine-formaldehyde resin content of the acidic aqueous solution, as a higher resin content usually correlates with a higher content of free formaldehyde. Accordingly, the higher the content of melamine-formaldehyde resin, the greater is the amount of oxidising agent added. For contents of the order of magnitude of 15 wt. % melamine-formaldehyde resin, the quantity of oxidising agent added in variant A is preferably 0.3 to 3 wt. % and in variants B and C is preferably between 0.5 and 5 wt. %.

The concentration of the free formaldehyde in the solution of the melamine-formaldehyde resin is decreased by the reaction with the oxidising agent. As a result of this, less free formaldehyde is available for a further cross-linking reaction. Thus, the solutions of the melamine-formaldehyde resins are stabilized against further cross-linking by the decomposition of the free formaldehyde. This permits stable solutions having higher contents of melamine-formaldehyde resins to be prepared in a form more storable than would be possible without the lowering of the formaldehyde concentration.

As expected, the speed of the oxidation of the formaldehyde depends on the temperature at which the oxidising agent is added. The intended lowering of the content of free formaldehyde is achieved within a short time in variant C, while in variants A and B it may take several hours.

In all the variants, hydrogen peroxide, performic acid or peracetic acid may be added as pure substances or as aqueous solutions. For reasons of safety, aqueous solutions are preferred. For example, hydrogen peroxide is preferably used in the form of a commercially-available, about 30 wt. % aqueous solution.

Prior to the addition of the oxidising agent, the acidic aqueous solution of the melamine-formaldehyde resin has a pH preferably in the range of about 1.5 to about 3.5. The use of hydrogen peroxide as oxidising agent is preferred for economic reasons.

The process according to the present invention is an environmentally and economically advantageous alternative to the process according to WO 94/10231 for significantly lowering the content of free formaldehyde in acidic aqueous solutions of melamine-formaldehyde resins. The use of such acidic aqueous solutions in the above-mentioned fields of use is thereby associated with fewer health hazards. The present invention is especially designed for the use of acidic aqueous solutions of melamine-formaldehyde resins for the coagulation of solvent-based or water-based paints in the construction of automobiles. The relevant conditions of use are described in detail in U.S. Pat. No. 4,656,059 cited above, to which reference is again hereby expressly made.

The content of free formaldehyde in the above-mentioned acidic aqueous solutions may be determined by the following method.

Reagents

Isopropanol

Sodium sulfite, 1 M (126 g/l)

Hydrochloric acid, 0.1 M

Sodium hydroxide solution, 0.1 M

Thymolphthalein (0.1 % in 90 % EtOH)Analysis

Solution X:

6 g of the sample is weighed into a 250 ml beaker addition of 5 ml isopropanol 100 g crushed ice is added, the temperature should be between 0 and −10° C.

addition of 5 drops of indicator solution titration using 0.1 M sodium hydroxide solution until the blue coloration persists for at least 30 seconds Solution Y:

10.0 ml of a 0.1 M hydrochloric acid solution is placed in a 250 ml beaker.

The next steps must be carried out within 60 seconds at maximum:

solution X is introduced into the beaker already containing the hydrochloric acid (solution Y)

addition of 15 ml sodium sulfite solution (corresponds to 15 mmol=0.45 g formaldehyde)

the solution is titrated using 0.1 M sodium hydroxide solution until the latter is deep blue (symbol B)

the consumption should be between 4 and 6 ml.

Calculation $$\text{Formaldehyde [in \%]} = \frac{\{(A*t1) - (B*t2)\}*30.03*100}{W*1000}$$

A [in ml]: hydrochloric acid used
B [in ml]: consumption of sodium hydroxide solution
W [in g]: weight of sample
t1: titre of HCl
t2: titre of NaOH

What is claimed is:

1. A process for decreasing the content of free formaldehyde in an acidic aqueous solution comprised of melamine-formaldehyde resin, formic acid, and formaldehyde, said process comprising contacting said acidic aqueous solution with from 0.1 to 6 weight percent, based on the weight of said acidic aqueous solution, of at least one oxidising agent selected form the group consisting of hydrogen peroxide, performic acid, and peracetic acid, wherein said acidic aqueous solution has a pH of from 0.5 to 4.

2. The process of claim 1 wherein the acidic aqueous solution is comprised of between 5 and 30 weight % melamine-formaldehyde resin.

3. The process of claim 1 wherein said acidic aqueous solution is prepared and within 3 hours after preparation while maintained at a temperature of 5 to 30° C. is contacted with from 0.1 to 5 weight %, based on the weight of said acidic aqueous solution, of said at least one oxidising agent.

4. The process of claim 1 wherein said acidic aqueous solution is prepared and, after a period of from 3 to 48 hours at a temperature of 5 to 30° C., is contacted with from 0.1 to 6 weight %, based on the weight of said acidic aqueous solution, of said at least one oxidising agent.

5. The process of claim 1 wherein said acidic aqueous solution is prepared and, after a period of 30 minutes to 5 hours at a temperature of 10 to 100° C., is contacted with from 0.1 to 6 weight %, bas on the weight of said acidic aqueous solution, of said at least one oxidising agent.

6. The process of claim 1 wherein said acidic aqueous solution has a pH of 1.5 to 3.5.

7. The process of claim 1 wherein at least one oxidising agent is hydrogen peroxide.

8. The process of claim 1 wherein the content of free formaldehyde in said acidic aqueous solution before said contacting is between about 0.2 and about 4 weight %.

9. The process of claim 1 wherein the content of free formaldehyde in said acidic aqueous solution after said contacting is lowered to between 10 ppm and 1 weight %.

10. The process of claim 1 wherein the acidic aqueous solution is comprised of 0.3 to 20 weight % formic acid.

11. A process for decreasing the content of free formaldehyde in an acidic aqueous solution having a pH of from 0.5 to 4 and comprised of 5 to 30 weight % melamine-formaldehyde resin, 0.3 to 20 weight % formic acid, and about 0.2 to about 4 weight % free formaldehyde, said process comprising contacting said acidic aqueous solution with from 0.1 to 6 weight %, based on the weight of said acidic aqueous solution, of at least one oxidising agent selected from the group consisting of hydrogen peroxide, performic acid, and peracetic acid for a time and at a temperature effective to lower the content of free formaldehyde to between 10 ppm and 1 weight %.

12. The process of claim 11 wherein said acidic aqueous solution is prepared and, within 3 hours after preparation while maintained at a temperature of 5 to 30° C., is contacted with from 0.1 to 5 weight %, based on the weight of said acidic aqueous solution, of said at least one oxidising agent.

13. The process of claim 11 wherein said acidic aqueous solution is prepared and, after a period of from 3 to 48 hours at a temperature of 5 to 30° C., is contacted with said at least one oxidising agent.

14. The process of claim 11 wherein said acidic aqueous solution is prepared and, after a period of 30 minutes to 5 hours at a temperature of 30 to 100° C., is contacted with said at least one oxidising agent.

* * * * *

UNITED STATES PATENT AND TRADEMARK OFFICE
CERTIFICATE OF CORRECTION

PATENT NO. : 6,384,184 B1
DATED : May 7, 2002
INVENTOR(S) : Steffen Ruesse

It is certified that error appears in the above-identified patent and that said Letters Patent is hereby corrected as shown below:

<u>Title page,</u>
Item [57], ABSTRACT,
Line 4, delete "be"; and insert therefor -- the --.

<u>Column 4,</u>
Line 60, delete "form" and insert therefore -- from --.

<u>Column 5,</u>
Line 12, delete "bas" and insert therefore -- based --.

Signed and Sealed this

Fourth Day of March, 2003

JAMES E. ROGAN
*Director of the United States Patent and Trademark Office*